United States Patent
Geethakumar et al.

(10) Patent No.: US 11,930,039 B1
(45) Date of Patent: Mar. 12, 2024

(54) METRIC SPACE MODELING OF NETWORK COMMUNICATION

(71) Applicant: Amazon Technologies, Inc., Seattle, WA (US)

(72) Inventors: Sarath Geethakumar, Bellevue, WA (US); Wayne Chiang, Seattle, WA (US); Shravan Kumar Gopal, Vancouver (CA); Yash Zalavadia, Houston, TX (US)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 17/527,993

(22) Filed: Nov. 16, 2021

(51) Int. Cl.
| | |
|---|---|
| *H04L 9/40* | (2022.01) |
| *G06F 18/21* | (2023.01) |
| *G06F 18/22* | (2023.01) |
| *G06F 18/23* | (2023.01) |
| *G06N 20/00* | (2019.01) |

(52) U.S. Cl.
CPC ........ *H04L 63/1458* (2013.01); *G06F 18/217* (2023.01); *G06F 18/22* (2023.01); *G06F 18/23* (2023.01); *G06N 20/00* (2019.01); *H04L 63/1416* (2013.01); *H04L 63/1425* (2013.01)

(58) Field of Classification Search
CPC ............. H04L 63/1458; H04L 63/1416; H04L 63/1425; G06F 18/217; G06F 18/22; G06F 18/23; G06N 20/00
See application file for complete search history.

(56) References Cited

U.S. PATENT DOCUMENTS

| | | | | |
|---|---|---|---|---|
| 8,997,227 | B1* | 3/2015 | Mhatre | H04L 63/1416 726/23 |
| 10,270,738 | B1* | 4/2019 | Kuo | G06F 9/547 |
| 10,270,875 | B1* | 4/2019 | Kuo | H04L 67/561 |
| 10,469,275 | B1* | 11/2019 | Broomall | H04L 51/52 |
| 10,650,432 | B1* | 5/2020 | Joseph | G06N 3/08 |
| 11,457,031 | B1* | 9/2022 | Bisht | G06N 7/01 |
| 2017/0279829 | A1* | 9/2017 | Vasseur | H04L 63/1458 |
| 2017/0310691 | A1* | 10/2017 | Vasseur | H04L 41/0631 |
| 2018/0063188 | A1* | 3/2018 | Karin | H04L 63/1458 |
| 2018/0316707 | A1* | 11/2018 | Dodson | H04L 43/16 |
| 2020/0142763 | A1* | 5/2020 | Yang | G06F 11/079 |
| 2020/0162341 | A1* | 5/2020 | Vasseur | H04L 67/104 |
| 2021/0026722 | A1* | 1/2021 | Bhatia | G06F 11/079 |
| 2021/0124981 | A1* | 4/2021 | Kim | G06F 18/2413 |
| 2021/0142191 | A1* | 5/2021 | Faruquie | G06N 5/04 |
| 2021/0306354 | A1* | 9/2021 | Raghuramu | G06N 20/00 |

(Continued)

*Primary Examiner* — J. Brant Murphy
(74) *Attorney, Agent, or Firm* — K&L Gates LLP

(57) ABSTRACT

Devices and techniques are generally described for detection of network anomalies. In various examples, first data describing network communication between a plurality of source entities and a plurality of destination entities may be received. In some examples, respective feature data representing network communication between a respective source entity and one or more of the plurality of destination entities may be generated. In some examples, an unsupervised machine learning model may be used to determine a first number of clusters of the feature data. In various cases, a first source entity that is an outlier with respect to the first number of clusters may be determined based at least in part on the first number of clusters. The first source entity may be classified as an anomalous entity.

20 Claims, 6 Drawing Sheets

(56) References Cited

U.S. PATENT DOCUMENTS

| | | | |
|---|---|---|---|
| 2022/0138504 A1* | 5/2022 | Fathi Moghadam | G06N 20/20 |
| | | | 706/12 |
| 2022/0415149 A1* | 12/2022 | Albero | G08B 13/22 |
| 2023/0054186 A1* | 2/2023 | Messous | H04L 63/1425 |
| 2023/0125203 A1* | 4/2023 | Saeed | H04L 63/1441 |
| | | | 726/23 |

* cited by examiner

METRIC SPACE MODELING OF NETWORK COMMUNICATION

BACKGROUND

Online fraud attempts and denial-of-service (DoS) attacks continue to grow year-over-year, putting pressure on online entities and network administrators to innovate in order to protect customers, revenue, and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
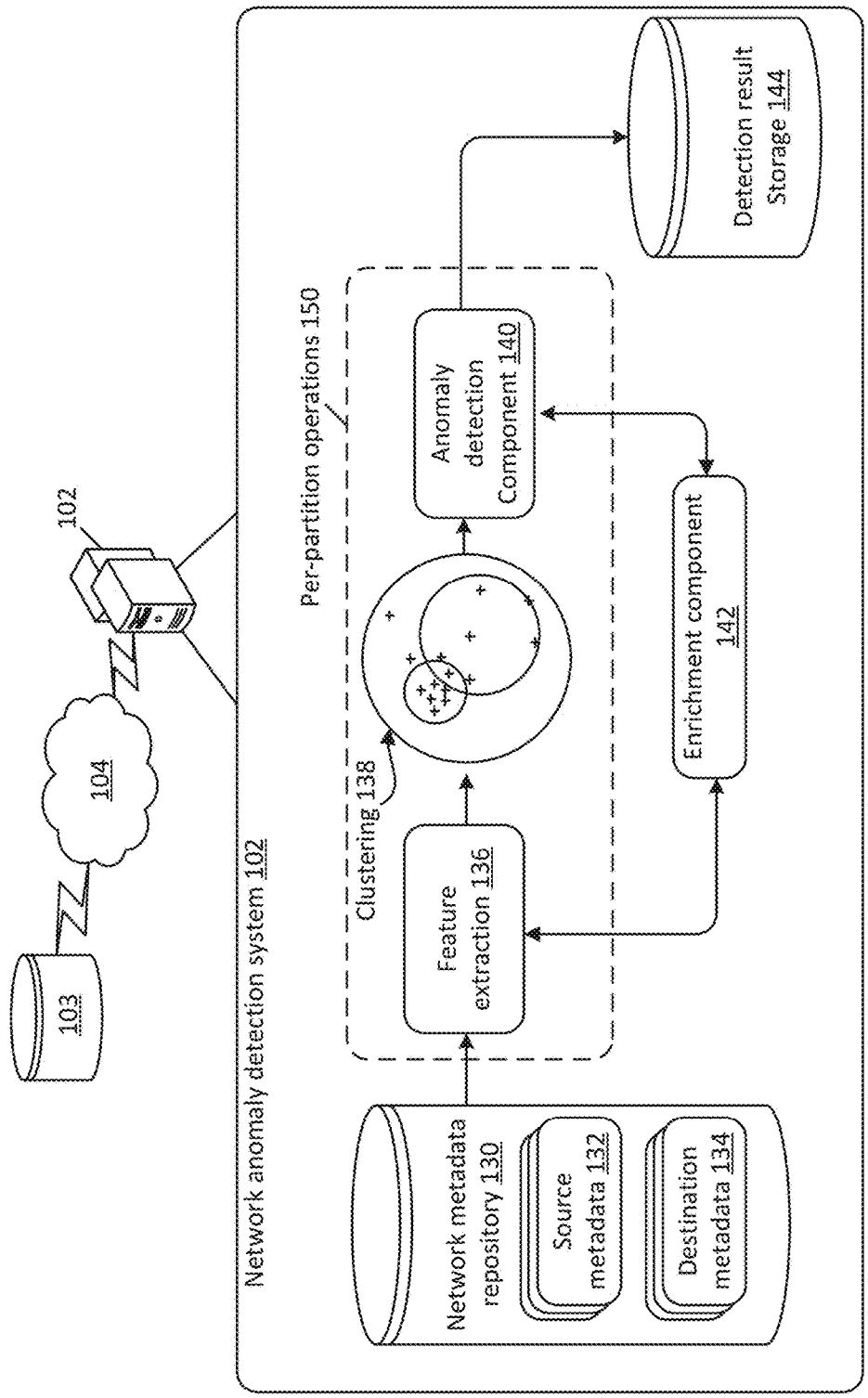
FIG. 1 is a block diagram illustrating a network anomaly detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Cybersecurity refers to the practice of defending computers, servers, mobile devices, networks, and/or stored data from malicious attacks typically aimed at DoS, unauthorized data exfiltration, malware installation, unauthorized access, etc. Many typical techniques used to detect network intrusions and data exfiltration rely on a combination of signature-based detection and Deep Packet Inspection (DPI). Anomalous network activities refer to unusual and/or suspicious network communication activity that may correspond to malicious activity. Accordingly, described herein are various systems and techniques that may be used for detection of anomalous network activity. Detection of anomalous network activity may allow for remedial actions and/or prevention of malicious attacks, security breaches, and/or data exfiltration.

In signature-based detection, data is matched to known patterns or pre-determined rule sets. These systems, by their nature, are only able to detect known threats since the input dataset needs a reference definition which is generated or curated from existing examples. In many situations, such as the existence of novel, undetected, and/or uncategorized malware, there may not be a reference definition that exists to match the input dataset against. Therefore, this technique tends to result in low recall rates.

Deep packet inspection requires a thorough inspection of every payload transiting out of the network. There are numerous drawbacks to DPI. Analyzing every single payload packet is compute-resource intensive which makes it unsuitable in certain environments due to cost or other constraints. There also is a risk of violating users' privacy and breaching privacy regulations. DPI on encrypted data typically yields low fidelity output unless data can be decrypted, which poses additional security risk.

Described herein are techniques and systems used to model network communication in metric space to detect anomalous network activity. In various examples, systems and/or techniques described herein may take input data in the form of timestamped rows of unidirectional network interaction data. The various systems and techniques may transform such input data into mathematical vectors that may then be analyzed and modelled in an unsupervised machine learning setting to generate dynamic groupings of normal clusters that expose abnormal data points as outliers. In various examples described herein, the analysis of network activity may be enhanced by interacting with an enrichment component that continuously adapts the systems to new data points.

FIG. 1 is a block diagram illustrating a network anomaly detection system 102, according to various embodiments of the present disclosure. In various examples, one or more computing devices may implement the network anomaly detection system 102. In examples where more than one computing device implements the network anomaly detection system 102, the different computing devices may communicate with one another over a network 104. For example, a remote computing device (and/or remote system of computing devices) may communicate with network anomaly detection system 102 via an application programming interface (API) as a cloud-based service. For example, network traffic data representing communication between various source entities and various destination entities may be sent to network anomaly detection system 102 in order to detect anomalous network activity. Entities may be individual computing devices and/or computing networks communication with one another (e.g., over network 104).

In various examples, each of the one or more computing devices used to implement network anomaly detection system 102 may comprise one or more processors. The one or more computing devices used to implement network anomaly detection system 102 may be configured in communication with at least one non-transitory computer readable memory 103 ("memory 103"). In at least some examples, the one or more computing devices used to implement network anomaly detection system 102 may communicate with memory 103 over network 104. The memory 103 may store computer-readable instructions that, when executed by at least one processor of the one or more computing devices implementing network anomaly detection system 102, may be effective to program the one or more processors to perform the various anomalous rights detection techniques and/or execute the various algorithms described herein.

In various examples, network 104 is a wide area network, such as the Internet, while in other embodiments, the network 104 is a local area network (LAN) over which requests may be received. In some further embodiments, network 104 is a combination of the Internet and a LAN.

Network anomaly detection system 102 may include a network metadata repository 130. The network metadata repository 130 may store network traffic flow metadata describing aspects of network communication between source entities (computing devices and/or networks from which network traffic emanates) and destination entities (computing devices and/or networks to which network traffic is sent). Accordingly, source metadata 132 may describe source entities and data sent by source entities over one or more networks. Similarly, destination metadata 134 may describe destination entities and data received by destination entities over the one or more networks. The network metadata repository 130 may be a cloud-based distributed storage system.

Each individual record stored in network metadata repository 130 may represent a stateless unidirectional traffic flow in the network (e.g., network 104) that can be tagged with different attributes to group by different sub-partitions. For computer networks using the Internet Protocol (IP) communication suite, this metadata may include the source and destination IP addresses, source and destination ports, number of bytes transferred between the source and destination entities, number of packets sent between the source and destination entities, number of connections established (e.g., communication channels) between the source and destination entities, start and end times of the interaction, and may include other details about the transfer such as the network interface or device name, network name, user account, etc. Multiple individual records may be combined and analyzed together to draw meaningful insights into the interactions of the network. This data may be accumulated and partitioned by year, month, day, hour, etc.

In various examples, prior to feature extraction 136, the data stored in network metadata repository 130 may be formatted and/or partitioned. For example, a set of input data describing networking interactions may be received (e.g., on a periodic or semi-periodic basis (e.g., hourly)) from a storage medium containing the network metadata repository 130. The network flow log metadata may be extracted, parsed, and/or formatted as pre-processing prior to feature extraction 136. For example, the input data from network metadata repository 130 may be sub-partitioned along a dimension of the input data (e.g., user account, source entity, etc.) in which the generated insights are determined to be meaningful. Each sub-partition may be analyzed independently by the rest of the network anomaly detection system 102.

Feature extraction 136 may compute feature data (e.g., vector representations) using the formatted and/or partitioned data inputs. Accordingly, feature extraction 136 (and various other operations) may be a per-partition operations 150 performed for each relevant partition of the input data. In some examples, a source entity may be an entity on the network (e.g., the network being evaluated, such as network 104 and/or another network) that is generating network activity (e.g., packets or other network traffic). A destination entity may be an external/internal endpoint to which source entities connect and/or transfer data. For Internet Protocol (IP) based networks, the destination entity can be represented by IP addresses and/or port number. In various examples, network activity may be aggregated by source entity (e.g., per source entity) over a given time interval. The formatted and/or partitioned output from the network metadata repository 130 may be input to feature extraction 136.

Feature extraction 136 determines a set of features that are used to model network communication in metric space and which may be used to detect abnormalities such as network intrusions or data exfiltration. Feature extraction 136 may determine a set of mathematical vectors where each element of the vector represents a metric value along a dimension of the selected feature. For example, in order to detect abnormal behavior, the chosen feature set may be determined along a partition such as per-source entity. For example, for each source entity, feature extraction 136 may generate a feature vector (e.g., feature data) that includes the list of all network destination entities (described by the 3-tuple: {protocol, destination address, port}) with each position (e.g., element) of the feature vector representing a different destination entity. Destination entities may also be described using other characteristic data. For example, instead of IP addresses, the destination entity may be described using the domain of each destination entity. The value of each element of the feature vector may represent a respective metric value (for the selected metric) representing network communication between the source entity (e.g., the source entity for which the feature vector has been calculated) and the respective destination entity. Metric values may include, for example, the number of connections established between the source entity and the respective destination entity, the total number of bytes transferred between the source entity and the respective destination entity, the number of packets sent between the source entity and the respective destination entity, etc. In some other examples, metric values may include connection duration (e.g., over a given time period).

In various examples, the component performing feature extraction 136 may interact with, and may alter the state of, enrichment component 142. The enrichment component 142 acts as a dimensionality reducer for feature vectors output by feature extraction 136 since it can identify a particular input data point and de-duplicate it (by reducing a dimensionality of the feature vector definition of feature vectors output by feature extraction 136 if the data point has previously been seen). If an input data point has been seen before, then no new dimension may be added to the feature vector. Rather, a value of an existing element of the feature vector (e.g., a metric value) may be updated to reflect the existence of this additional input data point. This may improve the performance of the clustering 138 since high dimensional data tends to be sparse which therefore results in low similarity between feature vectors which, in turn, may result in low precision in statistical results.

As described below, in reference to FIG. 2, clustering 138 may group similar feature vectors together into clusters. Accordingly, features vectors of source entities with highly similar (or in some cases identical) network communication profiles may be grouped together in the same cluster, while anomalous source entities (e.g., with anomalous network communication patterns) may be outliers with respect to the clusters.

Anomaly detection component 140 applies additional domain knowledge and/or statistical scoring to the clustering output in order to determine whether to classify a source entity as anomalous (e.g., as an anomalous network entity) or as valid. The output of clustering 138 includes clusters or groups of normal, or expected, network communication data, and any unclustered points may be considered outliers using outlier detection techniques. Anomaly detection component 140 may thus calculate a set of metrics similar to Local Outlier Probabilities while incorporating domain knowledge to these outliers to determine the probability, or confidence level, of the output as an anomaly. For example, if the output of the clustering 138 includes an unclustered point, but this unclustered point has a similar network fingerprint as multiple normal clusters (e.g., in that the source entity associated with the unclustered point interacted with a subset of the union of destinations that normal clusters interacted with, but not in the exact combination of a normal cluster), then the source entity may be given a low anomaly score by anomaly detection component 140. The low anomaly score for the source entity may be due to the source entity exhibiting network communication with known destination entities and/or due to having only interactions with known clusters of destination entities. However, if the unclustered point interacted with an external network destination that no normal cluster interacted with, then it may be assigned a high anomaly score by the anomaly detection component 140. The anomaly score may also be adjusted by contextual information from the enrichment component 142. For example, the enrichment component 142 may report certain destinations to be more or less suspicious than others, which may adjust the anomaly score higher or lower, respectively. In various examples, a threshold (which may be dynamically adjusted depending on the particular task and/or based on the clustering results) may be used to determine whether an unclustered point is classified as anomalous. In some examples, enrichment component 142 may communicate with external sources (e.g., DNS aggregation services, threat intelligence services, etc.) to receive data that may be used by anomaly detection component 140 when determining the confidence level of an anomalous source entity. For example, an outlier (e.g., an unclustered point) may be associated with external data indicating that the particular source entity has legitimate reasons for the traffic causing the source entity's network communication profile (e.g., the feature vector representing the entity) to appear anomalous.

For some datasets, it may be desirable to identify when there are multiple data points that provide the same information, but which occurred at different times. Such data points may be aggregated rather than recording a new output data point. In unidirectional network traffic flow data, each data point represents an interaction between two entities (a source entity and a destination entity). These two entities may interact multiple times during a particular aggregation window, and it is often desirable to simply summarize this aggregation with a count of the number of interactions and an aggregation of their statistics. The enrichment component 142 is a stateful component that may record and persist those input data points that have been seen in a particular aggregation window (e.g., within a selected timeframe). The timeframe may be the same or different from the interval of the input dataset.

The enrichment component 142 may also independently interact with external data sources in order to provide as much contextual information as possible to the anomaly detection component 140. This enrichment component 142 continually adapts to new incoming data points. In network anomaly detection system 102, using individual IP addresses of external entities (as individual elements of the feature vectors) may increase the noisiness and sparseness of the data. Sparse feature vectors, in turn, lead to decreased similarity between data points. For example, Amazon Web Services (AWS) S3 has over 30,000 IP addresses (represented by XX.XXX.XX8.0/17 and X.X.XX.0/22) in a single region. As described above, it may be desirable to de-duplicate the destination entities in the feature vectors generated by feature extraction 136. The destination entity index is the unique set of destination entities that a particular sub-partition of data interacts with during a particular aggregation period. If IP addresses such as 33.213.124.0, 33.213.124.1, 33.213.124.2, . . . and so on all are allocated to AWS S3, it is only relevant that a particular entity interacted with AWS S3, not that it interacted with a set of specific IP addresses. For example, one source entity may have communicated with 33.213.124.0 while another source entity may have communicated with 33.213.124.1. If in the Destination entity index, index 0 represents 33.213.124.0 and index 1 represents 33.213.124.1, the feature vectors for the two entities would be: [1, 0] and [0, 1]. This would indicate that there is no similarity between the two source entities. However, with de-duplication performed by enrichment component 142, these feature vectors would be reduced to a single dimension containing [1], which is the same, resulting in the two source entities being grouped together. De-duplicating destination entities may result in significant improvements in clustering 138 versus non-de-duplicated destination entities. In another example, enrichment component 142 may combine two or more IP addresses (e.g., of two separate destination entities) when the two IP addresses are associated with the same domain name.

In order to de-duplicate external IP addresses, IP ranges may be collected from various internet address data sources (e.g., AWS public IP ranges, Registration Data Access Protocol (RDAP) queries against the American Registry for Internet Numbers (ARIN) and other regional internet registries (RIRs)) and cache the results in a database table. This database may support queries such as "Given an external IP X (such as 33.213.124.0), which of the N classless inter-domain routing (CIDR) ranges in the database does this IP address fall into?" The number of CIDR ranges, N, stored in the database may depend on the unique set of destination entities that instances interact with across all monitored accounts. There are only a limited number of entities and IP ranges with which source entities can interact. There may be hundreds of thousands of rows in an IP address database. For this reason, it may be beneficial to use a relational approach to cache RDAP query results. An IPv4 address is a 32-bit number. An IPV4 CIDR range consists of an IPv4 address and a prefix length, or the number of shared initial bits. For each CIDR range, the low and high addresses may be computed in decimal form and may be stored as separate columns in a relational database. Sorted indexes created on these "low_address" and "high_address" columns can provide efficient IP address range queries for looking up an unknown IP address. The database is fronted by a local trie-based cache of queried IP CIDR ranges. This allows clients to avoid repeated network calls to the various data sources and database for repeated queries for the same CIDR range. CIDR ranges will be stored alongside other metadata and may be stored with a default time to live (TTL) of 30 days. After 30 days, the entry will expire on read and an RDAP query will need to be executed again. This TTL may be selected chosen since registration data is typically long-lived.

The classifications output by anomaly detection component 140 (e.g., "anomalous" or "non-anomalous") may be sent to detection result storage 144. Detection result storage 144 may be a configurable cloud or local durable storage system that may persist the classification results. The classification results may be kept in both machine and human-readable formats. Embodiments of detection result storage 144 may be a cloud object storage service such as Amazon S3, an enterprise repository such as a hosted Splunk indexer or ElastiSearch cluster, the local file system, other destinations reachable with an HTTP request, or any combination thereof.

Figure 2:
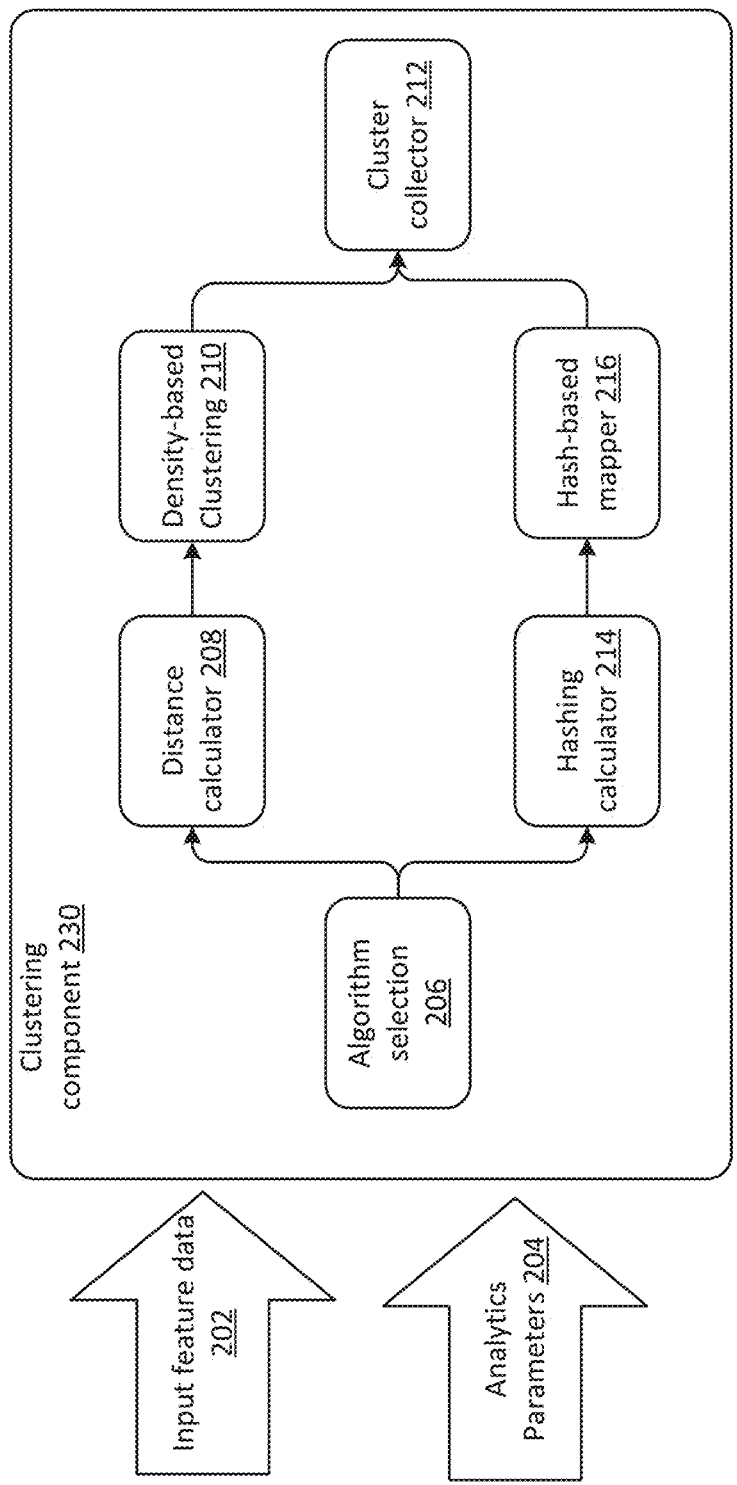
FIG. 2 is a block diagram illustrating a clustering component of the network anomaly detection system of FIG. 1, in accordance with various embodiments of the present disclosure.

FIG. 2 is a block diagram illustrating a clustering component 230 of the network anomaly detection system 102 of FIG. 1, in accordance with various embodiments of the present disclosure. Input feature data 202 may include feature vectors and/or other feature data extracted by feature extraction 136 (as described above). Analytics parameters 204 may include configuration data. In various examples, analytics parameters 204 may be read from a configuration file accessible by clustering component 230. In various examples, clustering component 230 may be effective to select from a variety of different clustering algorithms that may be used to cluster the input feature data 202. In various examples, algorithm selection 206 may be used to select a clustering algorithm. Accordingly, in some examples, the particular clustering algorithm may be specified using a user interface and/or API associated with clustering component 230 and/or algorithm selection 206. Analytics parameters 204 may include the threshold number of data points (e.g., feature vectors) at which to consider a grouping of data points to be a cluster (as opposed to noise). Other analytics parameters 204 may include data identifying the feature metrics to be used (e.g., number of connections between a source entity and a plurality of destination entities, amount of time connected, amount of data transferred, etc.). In various further examples, analytics parameters 204 may include a distance function and/or distance threshold (for distance-based clustering algorithms), etc.

In clustering component 230, the mathematical vectors (e.g., input feature data 202 comprising feature data) generated by feature extraction 136 may be processed and clusters of the data points (e.g., the feature vectors) may be created based on the similarity of the extracted feature set that was selected for the given dimension. In the example depicted in FIG. 2, clusters may be generated in different logical pipelines. It should be appreciated that additional logical pipelines beyond those specifically shown and described may also be used.

A first clustering pipeline may include computation of a similarity score between each pair of feature vectors using a configurable distance function (e.g., distance calculator 208) and may then use a density-based clustering component 210 that groups all points within a configurable distance threshold R into one output cluster. Different distance functions may be used by distance calculator 208 (and these distance functions may be specified by the analytics parameters 204). Some examples of such distance functions may include Euclidean distance, Cosine distance, Jaccard index, etc. The distance function may be selected by an operator of the system based on configuration parameters depending on the semantic meaning of properties in the data. This distance-based approach generalizes well, but has an algorithmic complexity of $O(m*n^2)$, where m is the number of dimensions of the metric feature vector and n is the number of feature vectors. Accordingly, in some examples, the distance-based approach may only be practical on relatively small numbers (e.g., ~1,000-10,000) of feature vectors unless the calculations are accelerated by a parallel computational environment such as with graphical processing units (GPUs). For the special case where R is chosen to have a value of zero (indicating that only clusters of data points with identical feature vectors are generated), a hashing approach may be more computationally efficient. For example, a hashing approach to clustering may have an algorithmic runtime complexity of $O(m*n)$ since only a hash value is computed for each feature vector (using hashing calculator 214—a hash function). All feature vectors with identical hash values may be clustered together (by hash-based mapper 216). Note that the hashing approach can also be generalized for arbitrary R values by using locality-sensitive hashing (LSH) which preserves the similarity of the input feature vectors in the output hash value. However, LSH techniques are typically probabilistic, meaning that not all feature vectors that should be grouped together will be grouped together with LSH. Accordingly, LSH may introduce an additional possibility of error. Accordingly, in the example of FIG. 2, a configurable/injectable feature vector distance calculator 208 (together with a density-based clustering component 210) may be used to generate clusters of the input feature data 202. Alternatively (or additionally) a hash calculator 214 and hash-based mapper 216 may be used to generate clusters of the input feature data 202. The cluster collector 212 may generate data representing all output clusters as well as data points (e.g., feature vectors along the relevant partition) that are outliers with respect to the generated clusters. As previously described, such outliers may be considered anomalous in some cases.

Figure 3:
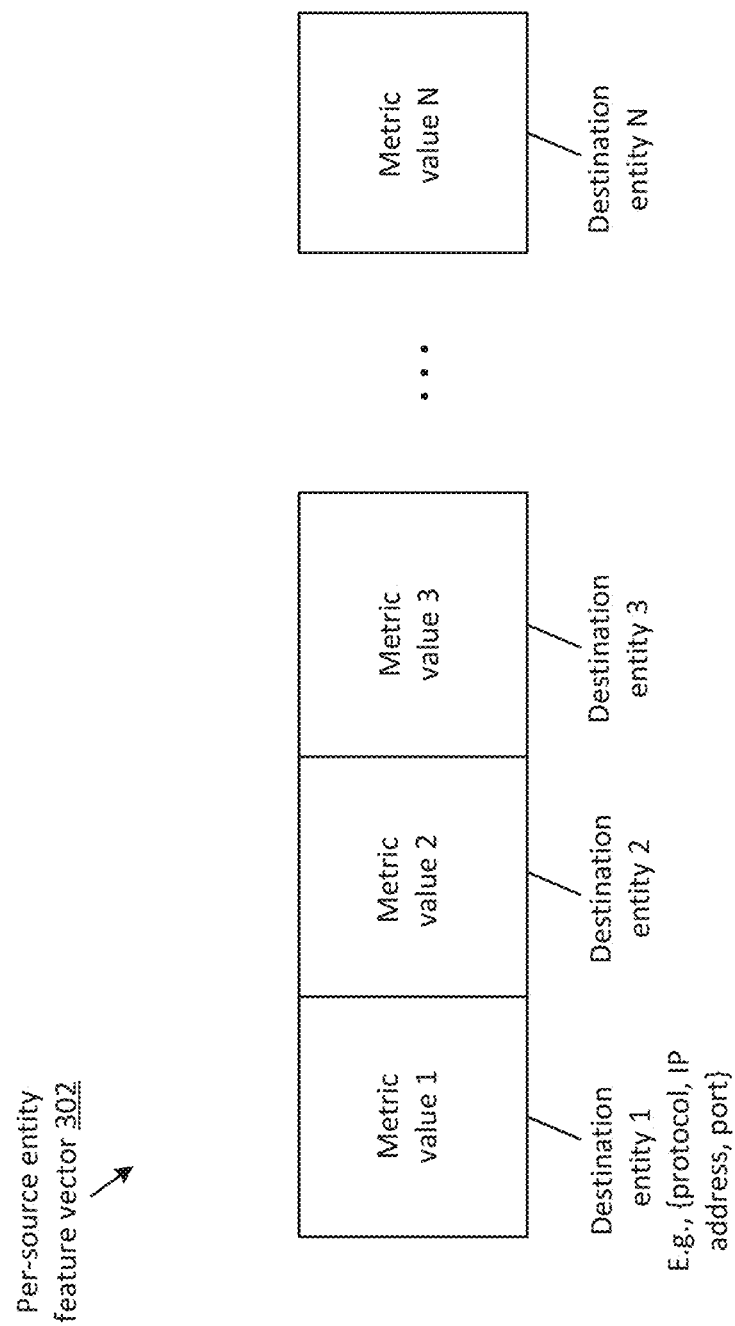
FIG. 3 is a diagram illustrating an example of a feature vector that may be used in accordance with various examples of the network anomaly detection systems and techniques described herein.

FIG. 3 is a diagram illustrating an example of a feature vector (e.g., per-source entity feature vector 302) that may be used in accordance with various examples of the network anomaly detection systems and techniques described herein. As previously described, data input into network anomaly detection system 102 representing network communication may be partitioned in various ways. In one example, the input data may be partitioned per-source entity (e.g., per entity that generates network traffic).

FIG. 3 represents an example of a per-source entity feature vector 302. Accordingly, per-source entity feature vector 302 may represent the network communication of a source entity over a pre-defined time period. Each element of the per-source entity feature vector 302 may correspond with a particular destination entity. As shown in FIG. 3, destination entities 1, 2, . . . , N are represented by the N elements of the per-source entity feature vector 302. As previously described, the enrichment component 142 may be used to deduplicate various sources and may thereby control and/or reduce the dimensionality of the per-source entity feature vector 302 (e.g., by grouping similar destinations together into single elements of the vector). As previously described, in some examples, the destination entities may be represented by the 3-tuple: {protocol, IP address, port}. However, the destination entities may be identified using other characteristic data. For example, the destination entities may instead by represented using domains of the respective destination entities. The value of each element of the per-source entity feature vector 302 may represent some metric of the network communication between the source represented by the per-source entity feature vector 302 and the respective destination entity. For example, metric value 1 may represent some aspect of the network communication between the source entity and destination entity 1 for the predefined time period. As previously described, metrics may include amount of data transmitted (e.g., number of bytes), number of connections established, number of packets sent, start and end times of interaction, connection duration, and/or any other desired metric. Accordingly, during the relevant time period, the values of each element of the per-source entity feature vector 302 may be modified according to the network communication between the source entity represented by per-source entity feature vector 302 and the various destination entities. Enrichment component 142 may be effective to combine various elements of the feature vectors (including per-source entity feature vector 302) in order to reduce dimensionality of the feature space. For example, as previously described, ranges of IP addresses may be combined into single elements of the per-source entity feature vector 302. Additionally, although the example described herein partition the input data along a per-source entity dimension, in various other examples, other partitions may be used (e.g., per-destination entity, etc.). The metric value may be selected based on the particular use case and/or the context of the metric-space modeling of the network communication. In various cases, in addition to detection of anomalous use cases, the metric-space modeling of network communication may be used to understand network communication profiles of different types of entities communicating on a network. In effect, the metric-space modeling of the network communication may establish typical "finger prints" of various different types of source entities. For example, a database host may have a distinctive network communication profile (and thus feature vector) relative to an instance of a cache service or an application server instance.

Figure 4:
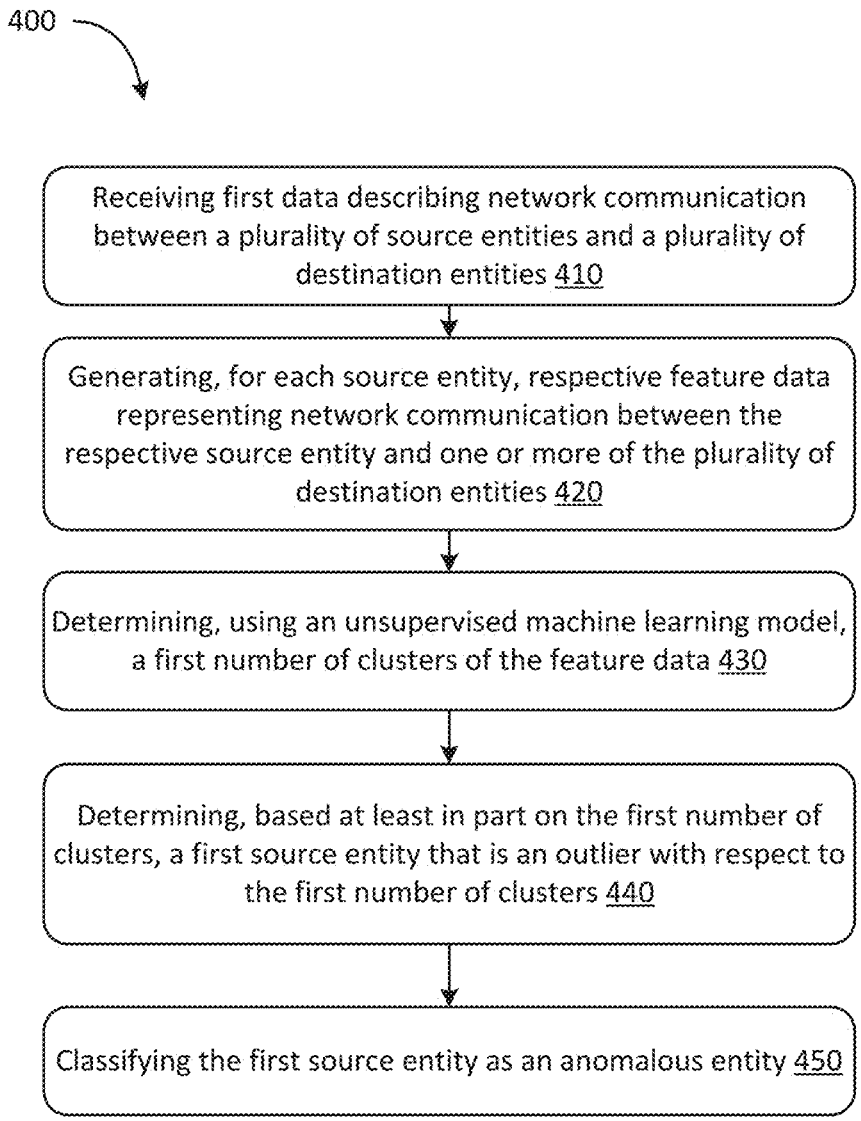
FIG. 4 is a flow diagram illustrating an example process for detecting anomalous network activity, according to various techniques described herein.

FIG. 4 is a flow diagram illustrating an example process 400 for detecting anomalous network activity, according to various techniques described herein. The process 400 of FIG. 4 may be executed by one or more computing devices. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 400 may be described above with reference to elements of FIGS. 1-3. Although shown in a particular order, the steps of process 400 may instead be performed in a different order. Additionally, various steps may be performed in parallel in various implementations. Further, some steps may be omitted and/or other steps may be added in accordance with the network anomaly detection techniques described herein.

Process 400 may begin at action 410, at which first data that describes network communication between a plurality of source entities and a plurality of destination entities may be received. The first data may include the source and destination IP addresses, source and destination ports, number of bytes transferred between the source and destination entities, number of packets sent between the source and destination entities, number of connections established between the source and destination entities, start and end times of the interaction, and may include other details about the transfer such as the network interface or device name, network name, user account, etc. Multiple individual records of network interactions may be combined and analyzed together to draw meaningful insights into the interactions of the network. This data may be accumulated and partitioned by year, month, day, hour, etc.

Processing may continue at action 420, at which respective feature data may be generated for each source entity. The feature data may represent network communication between the respective source entity and one or more of the plurality of destination entities. In various examples, the first data received at action 410 may be partition per-source entity. Feature data (e.g., a per-source feature vector as shown in FIG. 3) may be generated where each element (e.g., each dimension) of the feature data represents a different destination entity. The value of each element may represent a metric value of the some aspect of network communication between the source entity and the respective destination entity. In various examples, the enrichment component 142 may be used to group multiple destination entities (e.g., similar destination entities) into a single destination entity and/or single element in the feature data in order to reduce dimensionality.

Processing may continue at action 430, at which an unsupervised machine learning model may be used to generate a first number of clusters of the feature data. In various examples, clustering algorithms may be distance based algorithms (e.g., k-nearest neighbors (kNN), approximate nearest neighbors (e.g., ANNOY), etc.). In other examples, hash-based approaches may be used to determine a similarity between hash values of the various features (as described above in reference to FIG. 2). In various examples, the hash-based approaches may be more scalable, particularly when a large number of feature vectors are being clustered.

Processing may continue at action 440, at which a first source entity may be determined that is an outlier with respect to the first number of clusters. The fact that the first source entity is not clustered together with other source entities may indicate that the source entity is anomalous and/or does not have a similar network activity fingerprint as other source entities. Accordingly, an automated action may be taken and/or alert data may be generated to prompt investigation of the source entity. In various examples, domain knowledge may be used to evaluate any outlier source entities. For example, a particular source entity may be an outlier, but may nonetheless represent a legitimate source entity with acceptable network usage patterns (e.g., in that the source entity associated with the unclustered point interacted with a subset of the union of destinations that normal clusters interacted with, but not in the exact combination of a normal cluster). In various examples, the anomaly detection component 140 may determine an anomaly score for each source entity based on whether or not the source entity is an outlier and based on the domain knowledge. Processing may continue at action 450 at which the first source entity may be classified as an anomalous entity. In various examples, the anomaly score for the first entity may exceed a threshold anomaly score (e.g., based on the first entity being an outlier and/or based on domain knowledge). Various reactive measures may be taken in response to an entity's classification as anomalous. For example, a network firewall may be updated to prohibit an IP address of the source entity from accessing various subnets, etc. In other examples, the classifications and/or clustering data may be ingested by a different system, such as a data visualization tool, to evaluate and understand network communication patterns, anomalies, and/or constituents. In another example, the classifications and/or clustering data may be ingested by a messaging protocol that may publish messages using an asynchronous communication protocol.

Figure 5:
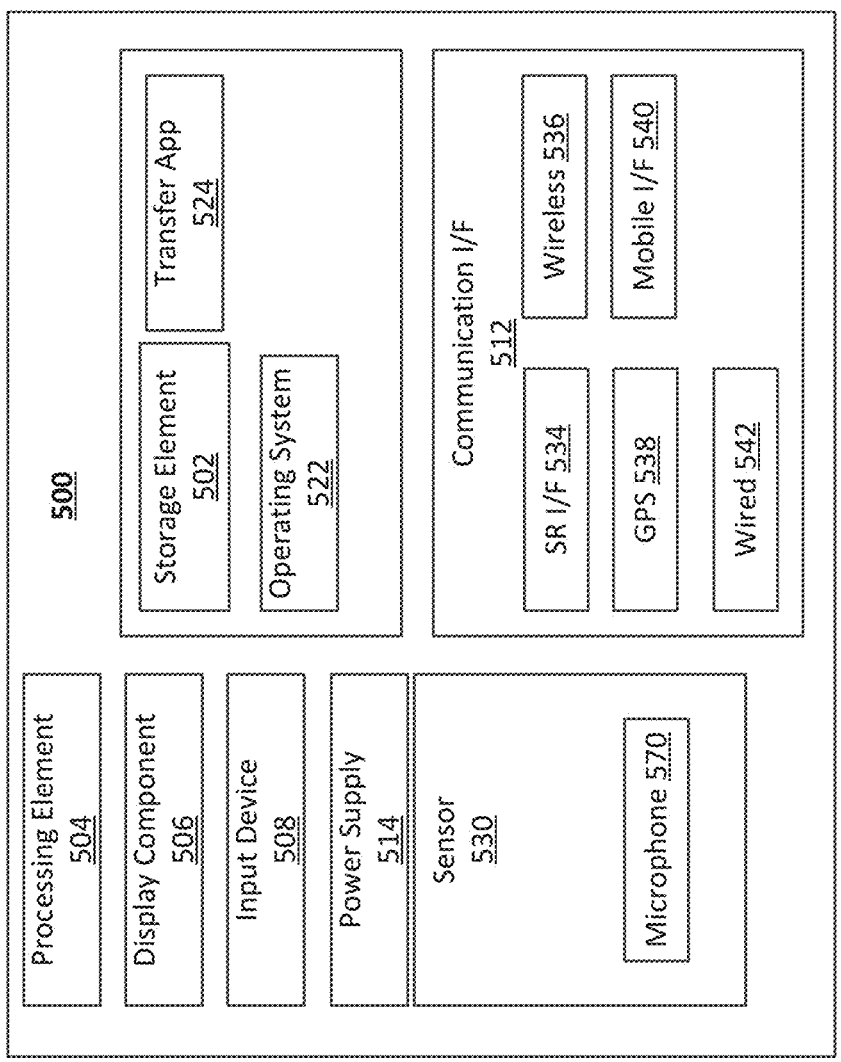
FIG. 5 is a block diagram showing an example architecture of a computing device that may be used in accordance with various embodiments described herein.

FIG. 5 is a block diagram showing an example architecture 500 of a computing device that may be used to implement, at least in part, a network anomaly detection system, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
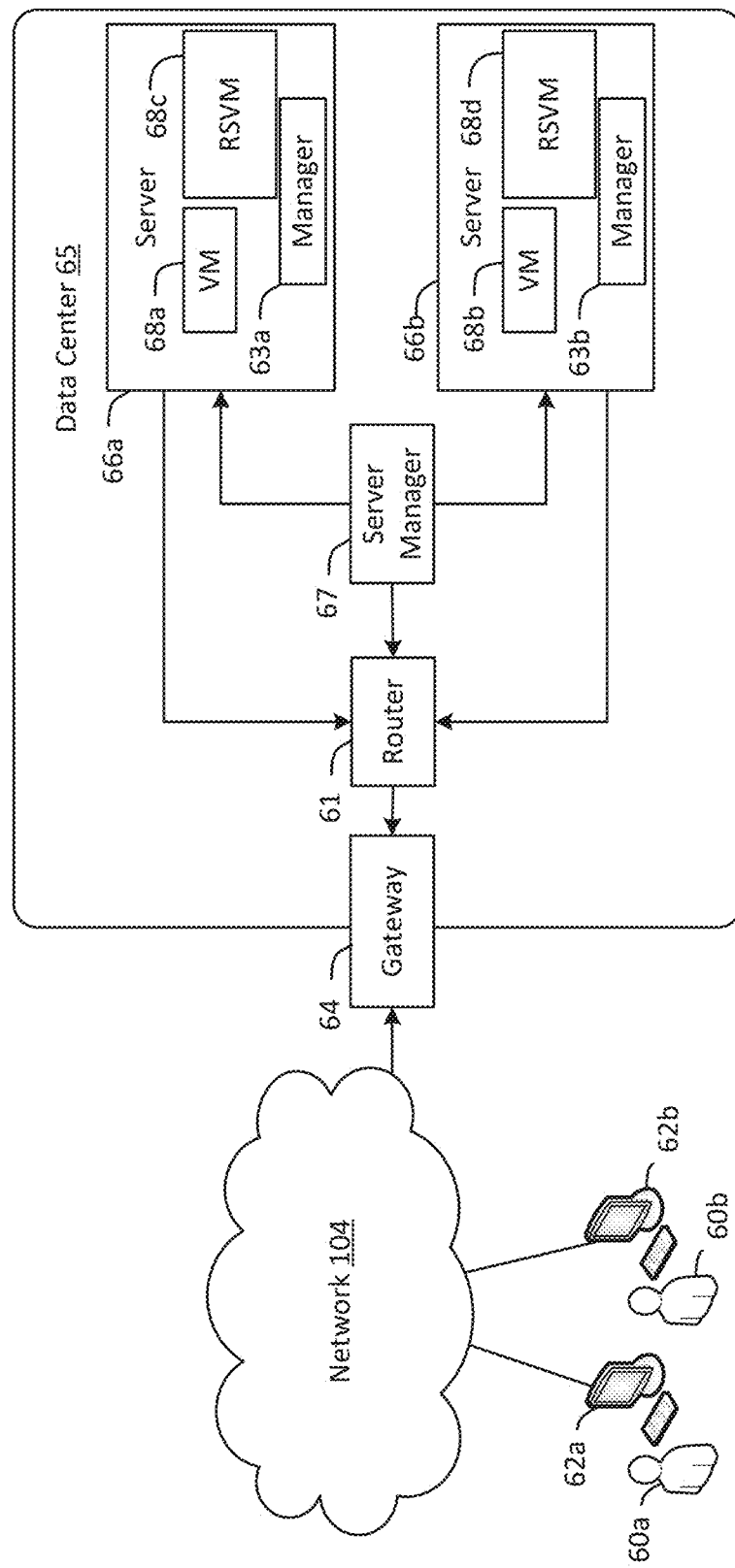
FIG. 6 is a diagram illustrating an example system for sending and providing data that may be used in accordance with the present disclosure.

An example system for implementing a network anomaly detection system will now be described in detail. In particular, FIG. 6 illustrates an example computing environment in which the embodiments described herein may be implemented. For example, the computing environment of FIG. 6 may be configured to provide network anomaly detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of metric space modeling of network communication, the method comprising:
   receiving input data representing network interactions between a plurality of source entities and a plurality of destination entities over a first time period;
   determining, for a first source entity of the plurality of source entities, a first feature vector, the first feature vector comprising a plurality of elements, wherein each element of the plurality of elements is associated with a respective destination entity of the plurality of destination entities, and wherein a value of each of the elements represents respective metric values describing network communication between the first source entity and the respective destination entity;
   inputting a plurality of feature vectors into a clustering algorithm, the plurality of feature vectors including the first feature vector, wherein each feature vector of the plurality of feature vectors represents network interactions of one of the plurality of source entities;
   generating, using the clustering algorithm, a first number of clusters of the plurality of feature vectors;
   determining that the first feature vector is not included in any clusters of the first number of clusters; and
   classifying the first source entity as an anomalous network entity based at least in part on the first feature vector being an outlier with respect to the first number of clusters.

2. The computer-implemented method of claim 1, wherein each of the respective metric values represents at least one of: a number of packets sent between the first source entity and the respective destination entity; a duration of time during which the first source entity communicated with the respective destination entity; an amount of data exchanged between the first source entity and the respective destination entity; and a number of connections established to a port of the respective destination entity.

3. The computer-implemented method of claim 1, further comprising:
   identifying a first element of the plurality of feature vectors that corresponds to a first internet protocol (IP) address of a first destination entity;
   identifying a second element of the plurality of feature vectors that corresponds to a second IP address of a second destination entity;
   determining that the first IP address and the second IP address resolve to the same domain; and
   representing metric values for the first IP address and the second IP address in a single element of the plurality of feature vectors.

4. A method comprising:
   receiving first data describing network communication between a plurality of source entities and a plurality of destination entities;
   generating, for each source entity of the plurality of source entities, respective feature data representing network communication between the respective source entity and one or more of the plurality of destination entities, the respective feature data representing network communication for the respective source entity over a first time period;
   determining, using an unsupervised machine learning model, a first number of clusters of the feature data;
   determining, based at least in part on the first number of clusters, a first source entity associated with feature data that is not included in a cluster of the first number of clusters; and
   classifying the first source entity as an anomalous entity.

5. The method of claim 4, further comprising:
   generating for a first source entity of the plurality of source entities, first feature data comprising a first feature vector, wherein the first feature vector includes a respective element for each destination entity of the plurality of destination entities, wherein the first feature vector further includes a value for each respective element, the value being associated with network communication between the first source entity and the respective destination entity associated with the respective element.

6. The method of claim 5, further comprising reducing a dimensionality of the first feature vector to generate a second feature vector, wherein the dimensionality is reduced based at least in part on a similarity between two or more destination entities of the plurality of destination entities.

7. The method of claim 4, further comprising:
determining first feature data representing a first source entity of the plurality of source entities;
determining second feature data representing a second source entity of the plurality of source entities; and
determining, using a first distance function, a distance between the first feature data and the second feature data in a feature space of the first feature data and the second feature data, wherein the first feature data and the second feature data are included in a cluster of the first number of clusters based at least in part on the distance.

8. The method of claim 4, further comprising:
determining first feature data representing a first source entity of the plurality of source entities;
determining second feature data representing a second source entity of the plurality of source entities;
generating, using a hash function, a first hash value representing the first feature data; and
generating, using the hash function, a second hash value representing the second feature data, wherein the determining the first number of clusters is based at least in part on grouping the first hash value and the second hash value together in a cluster of the first number of clusters.

9. The method of claim 4, wherein:
the respective feature data comprises a vector representation of the network communication for each source entity of the plurality of source entities; and
each element of the vector representation represents one or more of a number of packets sent, an amount of data sent, a number of times a communication channel was established, and a duration of time during which a communication channel was established with a respective destination entity of the plurality of destination entities.

10. The method of claim 4, further comprising:
determining, based at least in part on the first number of clusters, a second source entity that is not included in any cluster of the first number of clusters;
determining a similarity between feature data representing the second source entity and feature data representing a first cluster, wherein the network communication associated with the first cluster has been classified as valid network communication; and
classifying network communication associated with the second source entity as valid based at least in part on the similarity.

11. The method of claim 4, further comprising:
determining a first element of the feature data associated with a first internet protocol (IP) address;
determining a second element of the feature data associated with a second IP address different from the first IP address;
determining that the first IP address and the second IP address are associated with the same domain; and
reducing a dimensionality of the feature data based at least in part on the first IP address and the second IP address being associated with the same domain.

12. The method of claim 4, further comprising receiving, by the unsupervised machine learning model, a configuration file comprising a threshold number of source entities for a given cluster, a definition of a distance function, and a distance threshold used for outlier detection.

13. A system comprising:
at least one processor; and
non-transitory computer-readable memory storing instructions that, when executed by the at least one processor, are effective to:
receive first data describing network communication between a plurality of source entities and a plurality of destination entities;
generate, for each source entity of the plurality of source entities, respective feature data representing network communication between the respective source entity and one or more of the plurality of destination entities, the respective feature data representing network communication for the respective source entity over a first time period;
determine, using an unsupervised machine learning model, a first number of clusters of the feature data;
determine based at least in part on the first number of clusters, a first source entity associated with feature data that is not included in a cluster of the first number of clusters; and
classify the first source entity as an anomalous entity.

14. The system of claim 13, the non-transitory computer-readable memory storing further instructions that, when executed by the at least one processor, are further effective to:
generate for a first source entity of the plurality of source entities, first feature data comprising a first feature vector, wherein the first feature vector includes a respective element for each destination entity of the plurality of destination entities, wherein the first feature vector further includes a value for each respective element, the value being associated with network communication between the first source entity and the respective destination entity associated with the respective element.

15. The system of claim 14, the non-transitory computer-readable memory storing further instructions that, when executed by the at least one processor, are further effective to:
reduce a dimensionality of the first feature vector to generate a second feature vector, wherein the dimensionality is reduced based at least in part on a similarity between two or more destination entities of the plurality of destination entities.

16. The system of claim 13, the non-transitory computer-readable memory storing further instructions that, when executed by the at least one processor, are further effective to:
determine first feature data representing a first source entity of the plurality of source entities;
determine second feature data representing a second source entity of the plurality of source entities; and
determine, using a first distance function, a distance between the first feature data and the second feature data in a feature space of the first feature data and the second feature data, wherein the first feature data and the second feature data are included in a cluster of the first number of clusters based at least in part on the distance.

17. The system of claim 13, the non-transitory computer-readable memory storing further instructions that, when executed by the at least one processor, are further effective to:
determine first feature data representing a first source entity of the plurality of source entities;
determine second feature data representing a second source entity of the plurality of source entities;

generate, using a hash function, a first hash value representing the first feature data; and generate, using the hash function, a second hash value representing the second feature data, wherein the determining the first number of clusters is based at least in part on grouping the first hash value and the second hash value together in a cluster of the first number of clusters.

18. The system of claim 13, wherein:

the respective feature data comprises a vector representation of the network communication for each source entity of the plurality of source entities; and each element of the vector representation represents one or more of a number of packets sent, an amount of data sent, a number of times a communication channel was established, and a duration of time during which a communication channel was established with a respective destination entity of the plurality of destination entities.

19. The system of claim 13, the non-transitory computer-readable memory storing further instructions that, when executed by the at least one processor, are further effective to:

determine, based at least in part on the first number of clusters, a second source entity that is not included in any cluster of the first number of clusters;

determine a similarity between feature data representing the second source entity and feature data representing a first cluster, wherein the network communication associated with the first cluster has been classified as valid network communication; and classify network communication associated with the second source entity as valid based at least in part on the similarity.

20. The system of claim 13, the non-transitory computer-readable memory storing further instructions that, when executed by the at least one processor, are further effective to:

determine a first element of the feature data associated with a first internet protocol (IP) address;

determine a second element of the feature data associated with a second IP address different from the first IP address;

determine that the first IP address and the second IP address are associated with the same domain; and reduce a dimensionality of the feature data based at least in part on the first IP address and the second IP address being associated with the same domain.

\* \* \* \* \*